(12) United States Patent
Hirokawa

(10) Patent No.: US 11,394,847 B2
(45) Date of Patent: Jul. 19, 2022

(54) INFORMATION PROCESSING APPARATUS, METHOD FOR PROCESSING INFORMATION, AND INFORMATION PROCESSING SYSTEM

(71) Applicant: Tatsuma Hirokawa, Kanagawa (JP)

(72) Inventor: Tatsuma Hirokawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/199,654

(22) Filed: Mar. 12, 2021

(65) Prior Publication Data

US 2021/0297547 A1    Sep. 23, 2021

(30) Foreign Application Priority Data

Mar. 17, 2020  (JP) .............................. JP2020-046928
May 29, 2020   (JP) .............................. JP2020-095035

(51) Int. Cl.
*H04N 1/00* (2006.01)
*G06F 3/12* (2006.01)

(52) U.S. Cl.
CPC ....... *H04N 1/00938* (2013.01); *G06F 3/1204* (2013.01); *G06F 3/1225* (2013.01); *H04N 1/00408* (2013.01); *H04N 1/00506* (2013.01); *H04N 1/00962* (2013.01)

(58) Field of Classification Search
None
See application file for complete search history.

(56) References Cited

U.S. PATENT DOCUMENTS

| | | | |
|---|---|---|---|
| 2009/0237699 A1* | 9/2009 | Umezawa | H04N 1/32561 358/1.13 |
| 2017/0242572 A1 | 8/2017 | Inoue | |
| 2020/0045193 A1* | 2/2020 | Mori | H04N 1/00474 |
| 2020/0195791 A1* | 6/2020 | Takahashi | H04N 1/00973 |
| 2021/0006678 A1 | 1/2021 | Hirokawa | |

FOREIGN PATENT DOCUMENTS

| | | |
|---|---|---|
| JP | 2017-144649 | 8/2017 |
| JP | 2018-047658 | 3/2018 |
| JP | 2019-160226 | 9/2019 |

* cited by examiner

*Primary Examiner* — Frantz Bataille
(74) *Attorney, Agent, or Firm* — IPUSA, PLLC

(57) ABSTRACT

An information processing apparatus includes an installer configured to install a second application in addition to a first application; a setter configured to set a first setting item of the first application and a second setting item of the second application, the first setting item and the second setting item respectively belonging to one or more categories; and a displayer configured to display, in an aggregated manner, setting items belonging to a same category, among the first setting item of the first application and the second setting item of the second application.

10 Claims, 14 Drawing Sheets

FIG.4A

| SETTING OWNER | SETTING ITEM ID | SETTING TYPE | INPUT RANGE | TITLE (SETTING ITEM NAME) | SETTING VALUE | ARRANGEMENT SCREEN | DISPLAY ORDER |
|---|---|---|---|---|---|---|---|
| TIMER APP | 0001 | OPTION | ENABLE, DISABLE | SYSTEM AUTO RESET | ENABLE | SYSTEM SETTING | 128 |
| TIMER APP | 0002 | VALUE | 0~999 | SYSTEM AUTO RESET TIMER | 60 | SYSTEM SETTING | 160 |
| TIMER APP | 0003 | OPTION | ENABLE, DISABLE | COPY AUTO RESET | ENABLE | APPLICATION SETTING | 128 |
| TIMER APP | 0004 | VALUE | 0~999 | COPY AUTO RESET TIMER | 30 | APPLICATION SETTING | 192 |
| TIMER APP | 0005 | OPTION | ENABLE, DISABLE | SCANNER AUTO RESET | ENABLE | APPLICATION SETTING | 224 |
| TIMER APP | 0006 | VALUE | 0~999 | SCANNER AUTO RESET TIMER | 15 | APPLICATION SETTING | 240 |
| SOUND APP | 1001 | VALUE | 0~10 | SYSTEM OPERATION SOUND | 5 | SYSTEM SETTING | 192 |
| SOUND APP | 1002 | VALUE | 0~10 | COPY OPERATION SOUND | 10 | APPLICATION SETTING | 208 |
| SOUND APP | 1003 | VALUE | 0~10 | SCANNER OPERATION SOUND | 3 | APPLICATION SETTING | 248 |
| SECURITY APP | 2001 | OPTION | ENABLE, DISABLE | UNAUTHORIZED COPY PREVENTION PRINTING | ENABLE | APPLICATION SETTING | 216 |
| SECURITY APP | 2002 | CHARACTER STRING | 1 TO 32 CHARACTERS | PRINT CHARACTER STRING | COPY! | APPLICATION SETTING | 220 |
| ... | ... | ... | ... | ... | ... | ... | ... |

FIG.4B

| SETTING OWNER | SETTING ITEM ID | SETTING TYPE | INPUT RANGE | TITLE (SETTING ITEM NAME) | SETTING VALUE | ARRANGEMENT SCREEN | DISPLAY ORDER |
|---|---|---|---|---|---|---|---|
| TIMER APP | 0001 | OPTION | ENABLE, DISABLE | SYSTEM AUTO RESET | ENABLE | SYSTEM SETTING | 1 |
| TIMER APP | 0002 | VALUE | 0~999 | SYSTEM AUTO RESET TIMER | 60 | SYSTEM SETTING | 2 |
| TIMER APP | 0003 | OPTION | ENABLE, DISABLE | COPY AUTO RESET | ENABLE | APPLICATION SETTING | 1 |
| TIMER APP | 0004 | VALUE | 0~999 | COPY AUTO RESET TIMER | 30 | APPLICATION SETTING | 2 |
| TIMER APP | 0005 | OPTION | ENABLE, DISABLE | SCANNER AUTO RESET | ENABLE | APPLICATION SETTING | 3 |
| TIMER APP | 0006 | VALUE | 0~999 | SCANNER AUTO RESET TIMER | 15 | APPLICATION SETTING | 4 |
| SOUND APP | 1001 | VALUE | 0~10 | SYSTEM OPERATION SOUND | 5 | SYSTEM SETTING | 3 |
| SOUND APP | 1002 | VALUE | 0~10 | COPY OPERATION SOUND | 10 | APPLICATION SETTING | 2-1 |
| SOUND APP | 1003 | VALUE | 0~10 | SCANNER OPERATION SOUND | 3 | APPLICATION SETTING | 4-1 |
| SECURITY APP | 2001 | OPTION | ENABLE, DISABLE | UNAUTHORIZED COPY PREVENTION PRINTING | ENABLE | APPLICATION SETTING | 2-1-1 |
| SECURITY APP | 2002 | CHARACTER STRING | 1 TO 32 CHARACTERS | PRINT CHARACTER STRING | COPY! | APPLICATION SETTING | 2-1-2 |
| ... | ... | ... | ... | ... | ... | ... | ... |

| SETTING OWNER | SETTING ITEM ID | SETTING TYPE | INPUT RANGE | TITLE (SETTING ITEM NAME) | SETTING VALUE | ARRANGEMENT SCREEN | CATEGORY | DISPLAY ORDER |
|---|---|---|---|---|---|---|---|---|
| TIMER APP | 0001 | OPTION | ENABLE, DISABLE | SYSTEM AUTO RESET | ENABLE | SYSTEM SETTING | — | 128 |
| TIMER APP | 0002 | VALUE | 0~999 | SYSTEM AUTO RESET TIMER | 60 | SYSTEM SETTING | — | 160 |
| TIMER APP | 0003 | OPTION | ENABLE, DISABLE | COPY AUTO RESET | ENABLE | APPLICATION SETTING | COPY | 128 |
| TIMER APP | 0004 | VALUE | 0~999 | COPY AUTO RESET TIMER | 30 | APPLICATION SETTING | COPY | 192 |
| TIMER APP | 0005 | OPTION | ENABLE, DISABLE | SCANNER AUTO RESET | ENABLE | APPLICATION SETTING | SCANNER | 224 |
| TIMER APP | 0006 | VALUE | 0~999 | SCANNER AUTO RESET TIMER | 15 | APPLICATION SETTING | SCANNER | 240 |
| SOUND APP | 1001 | VALUE | 0~10 | SYSTEM OPERATION SOUND | 5 | SYSTEM SETTING | — | 192 |
| SOUND APP | 1002 | VALUE | 0~10 | COPY OPERATION SOUND | 10 | APPLICATION SETTING | COPY | 208 |
| SOUND APP | 1003 | VALUE | 0~10 | SCANNER OPERATION SOUND | 3 | APPLICATION SETTING | SCANNER | 248 |
| SECURITY APP | 2001 | OPTION | ENABLE, DISABLE | UNAUTHORIZED COPY PREVENTION PRINTING | ENABLE | APPLICATION SETTING | COPY | 216 |
| SECURITY APP | 2002 | CHARACTER STRING | 1 TO 32 CHARACTERS | PRINT CHARACTER STRING | COPY! | APPLICATION SETTING | COPY | 220 |
| ... | ... | ... | ... | ... | ... | ... | ... | ... |

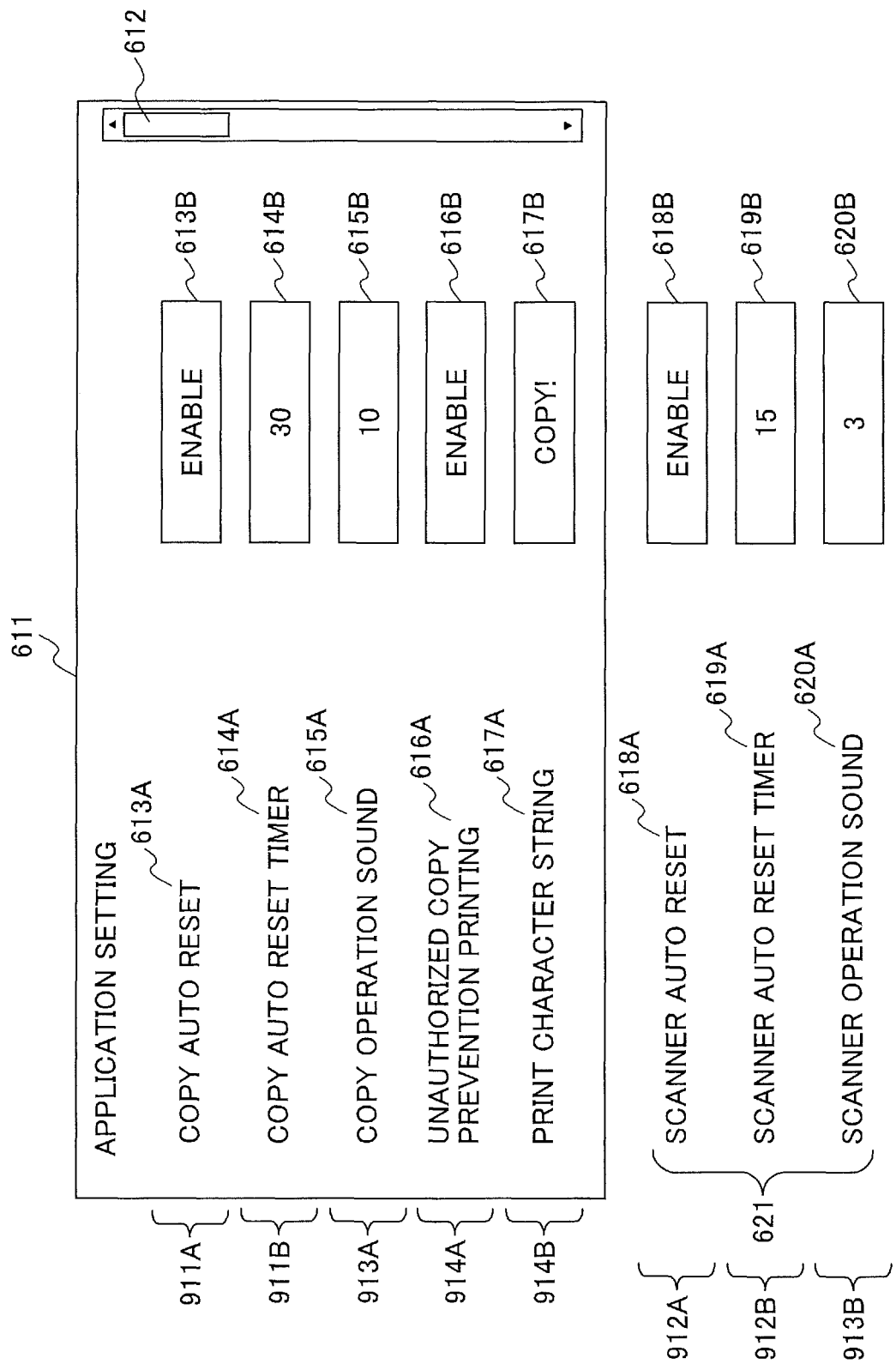

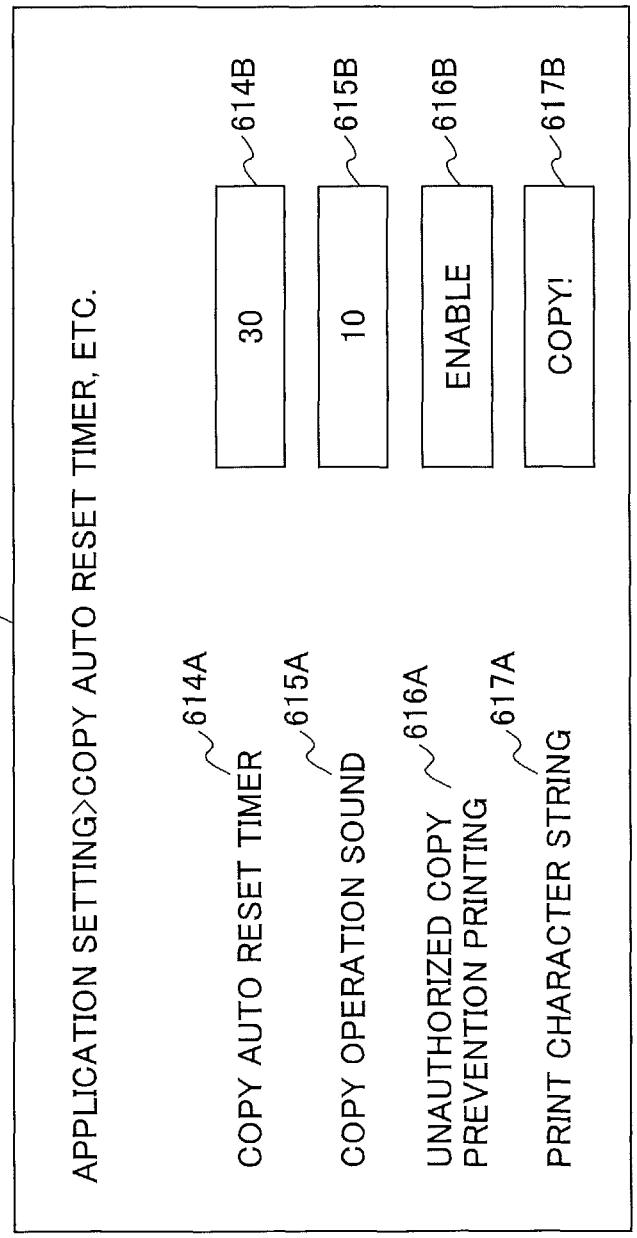

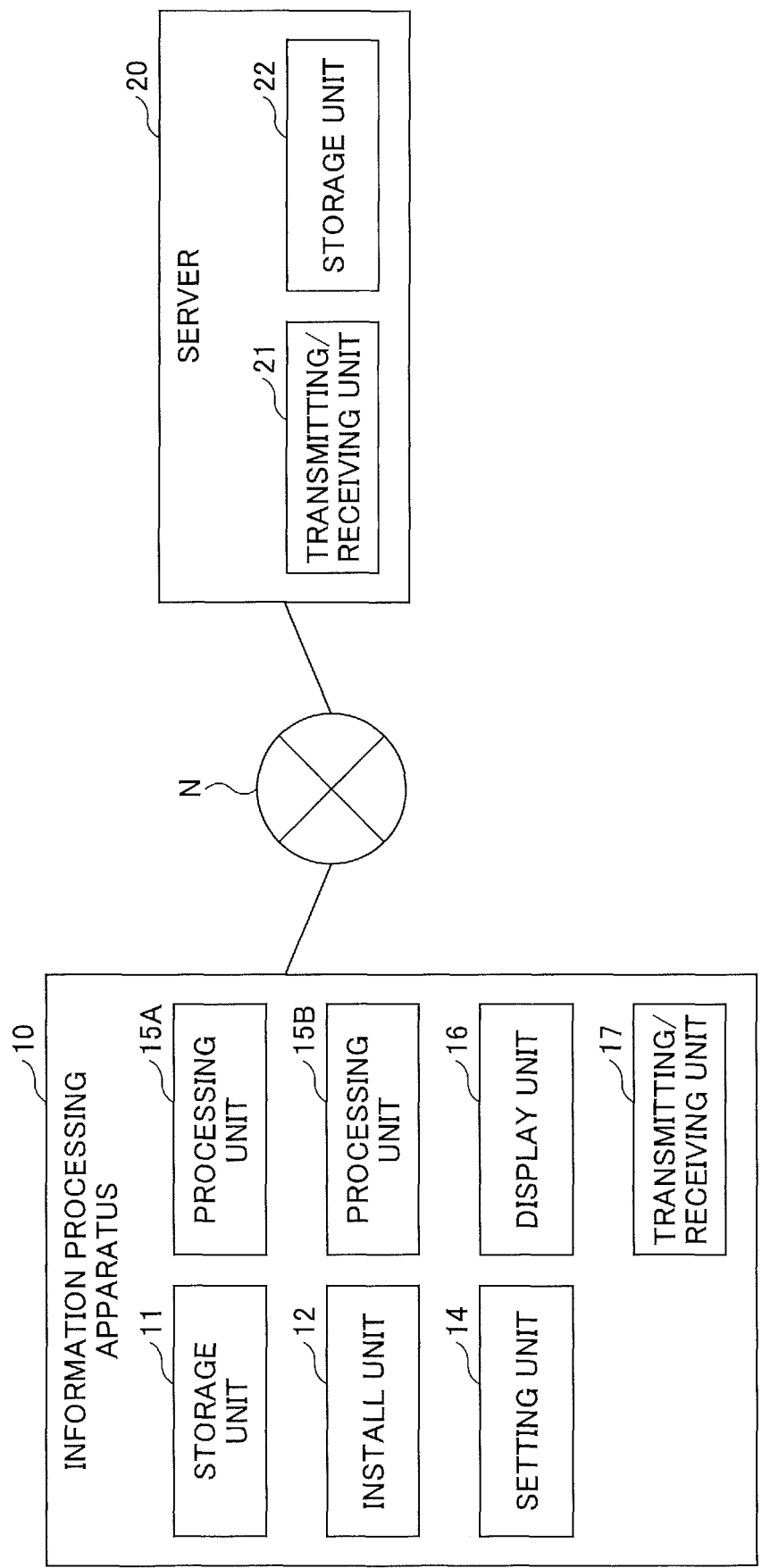

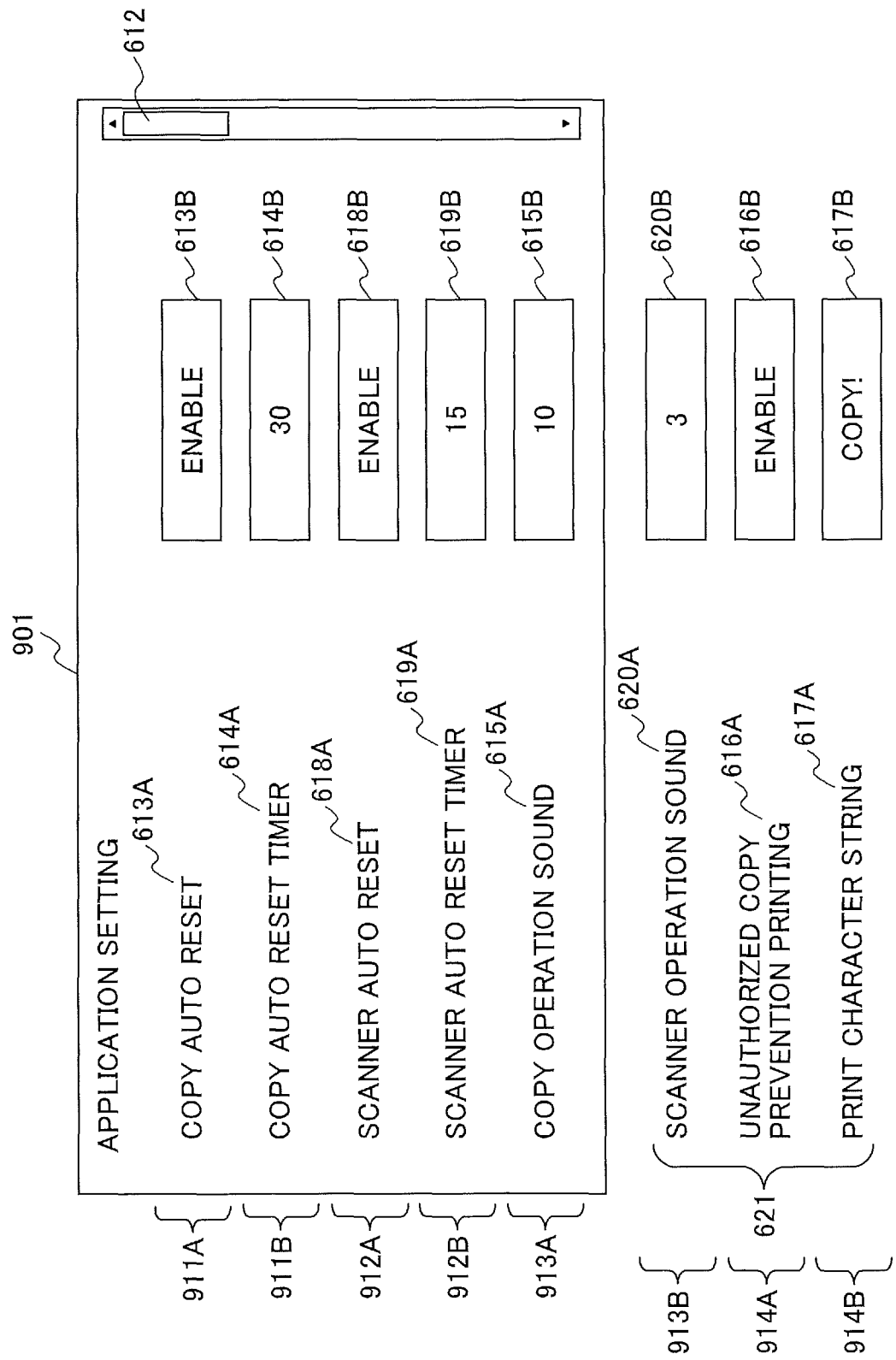

INFORMATION PROCESSING APPARATUS, METHOD FOR PROCESSING INFORMATION, AND INFORMATION PROCESSING SYSTEM

CROSS-REFERENCE TO RELATED APPLICATION

The present application is based on and claims priority under 35 U.S.C. § 119 to Japanese Patent Application No. 2020-046928, filed on Mar. 17, 2020 and Japanese Patent Application No. 2020-095035, filed on May 29, 2020, the contents of which are incorporated herein by reference in their entirety.

BACKGROUND OF THE INVENTION

1. Field of the Invention

The present invention relates to an information processing apparatus, a method for processing information, and an information processing system.

2. Description of the Related Art

Conventionally, a technique is known in which setting items, for each function executed by an application, are displayed in a predetermined order in a setting screen for the application, and input of setting values for each function is accepted from a user. For example, Patent Document 1 discloses that setting items are displayed in a setting screen in an order in which a user operates a plurality of setting items.

Patent Document 1: Japanese Unexamined Patent Application Publication No. 2018-047658

SUMMARY OF THE INVENTION

According to one aspect of the present invention, there is provided an information processing apparatus including an installer configured to install a second application in addition to a first application; a setter configured to set a first setting item of the first application and a second setting item of the second application, the first setting item and the second setting item respectively belonging to one or more categories; and a displayer configured to display, in an aggregated manner, setting items belonging to a same category, among the first setting item of the first application and the second setting item of the second application.

BRIEF DESCRIPTION OF THE DRAWINGS

FIG. 4A is a diagram illustrating an example of data stored in a setting DB according to the first embodiment of the present invention;

FIG. 4B is a diagram illustrating an example of data stored in a setting DB according to the first embodiment of the present invention;

FIG. 4C is a diagram illustrating an example of data stored in a setting DB according to the first embodiment of the present invention;

FIG. 6B is a diagram illustrating an example of a setting screen according to the first embodiment of the present invention;

FIG. 7B is a diagram illustrating an example of a setting screen according to the first embodiment of the present invention;

FIG. 8 is a diagram illustrating an example of a configuration of an information processing system according to a second embodiment of the present invention; and FIG. 9 is a diagram illustrating a comparative example of a setting screen.

DETAILED DESCRIPTION OF THE PREFERRED EMBODIMENTS

Conventionally, it has been difficult to accept settings for an application that is already installed and settings for a newly installed application, from a user at a uniform user interface.

A problem to be addressed by an embodiment of the present invention is to provide a technology that makes it possible to accept settings for an application that is already installed and settings for a newly installed application, from a user at a uniform user interface.

Hereinafter, embodiments will be described with reference to the drawings.

An information processing apparatus 10 according to an embodiment is, for example, an image forming apparatus such as a multifunction peripheral (MFP, Multifunction Peripheral/Product/Printer), an electronic blackboard, a smartphone, a tablet terminal, a computer such as a server, a video conference apparatus, a Head Up Display (HUD) apparatus, an industrial machine, a medical device, an electric appliance, an automobile, a personal computer (PC), a game machine, or the like. Hereinafter, a multifunction peripheral having a copy function, a scanner function, or the like will be described as an example of the information processing apparatus 10.

First Embodiment

In the first embodiment, an example in which a setting operation for each application that is installed in advance and a setting operation for each application that is additionally installed are accepted on the same setting screen by a setting program that is installed in advance, will be described. This makes it possible to accept, from a user, the settings for an application that is already installed and the settings for a newly installed application, by using a uniform user interface.

<Hardware Configuration>

Figure 1:
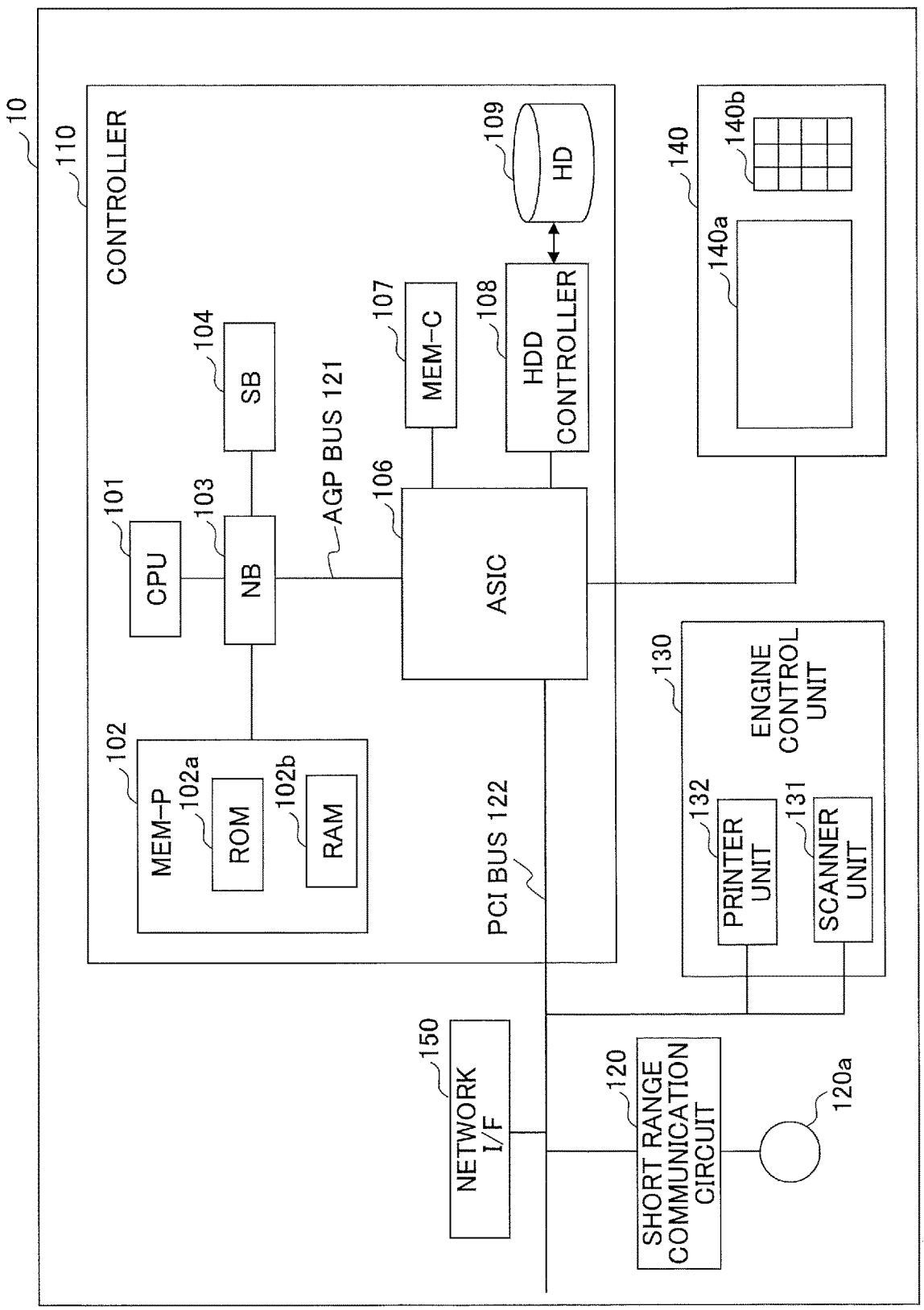
FIG. 1 is a diagram illustrating an example of a hardware configuration of an information processing apparatus according to a first embodiment of the present invention.

FIG. 1 is a diagram illustrating an example of a hardware configuration of an information processing apparatus 10 according to an embodiment. As illustrated in FIG. 1, the information processing apparatus 10 includes a controller 110, a short range communication circuit unit 120, an engine control unit 130, an operation panel 140, and a network interface (I/F) 150.

Among these, the controller 110 includes a central processing unit (CPU) 101 that is the main part of a computer, a system memory (MEM-P) 102, a North Bridge (NB) 103, a South Bridge (SB) 104, an Application Specific Integrated Circuit (ASIC) 106, a local memory (MEM-C) 107 as a storage unit, a hard disk drive (HDD) controller 108, and a hard disk (HD) 109 as a storage unit, and is configured such that the NB 103 and the ASIC 106 are coupled to each other by an Accelerated Graphics Port (AGP) bus 121.

Among these, the CPU 101 is a control unit that performs overall control of the information processing apparatus 10. The NB 103 is a bridge for coupling the CPU 101, the MEM-P 102, the SB 104, and the AGP bus 121, and includes a memory controller for controlling reading and writing with respect to the MEM-P 102, a Peripheral Component Interconnect (PCI) master, and an AGP target.

The MEM-P 102 includes a read-only memory (ROM) 102a, which is a memory for storing programs and data for implementing each function of the controller 110, and a random access memory (RAM) 102b, which is used for expansion of programs and data, a rendering memory at the time of memory printing, or the like. The program stored in the RAM 102b may be configured to be recorded in and provided by a computer-readable recording medium such as a compact disk read-only memory (CD-ROM), a CD recordable (CD-R), a digital versatile disc (DVD) or the like, in a file of an installable format or an executable format.

The SB 104 is a bridge for coupling the NB 103 to PCI devices and peripheral devices. The ASIC 106 is an integrated circuit (IC) for image processing applications having hardware elements for image processing, and serves as a bridge coupling the AGP bus 121, a PCI bus 122, the HDD controller 108, and the MEM-C 107, respectively. The ASIC 106 includes a PCI target and an AGP master, an arbitrator (ARB) that forms the core of the ASIC 106, a memory controller that controls the MEM-C 107, a plurality of Direct Memory Access Controllers (DMACs) that rotate image data by hardware logic or the like, and a PCI unit that performs data transfer between a scanner unit 131 and a printer unit 132 via the PCI bus 122. The ASIC 106 may be coupled to an interface of the Universal Serial Bus (USB) or the IEEE 1394 (Institute of Electronic and Electronic Engineers 1394).

The MEM-C 107 is a local memory used as an image buffer for copying and a code buffer. The HD 109 is a storage for storing image data, for storing font data used for printing, and for storing forms. The HDD controller 108 controls the reading or writing of data with respect to the HD 109 according to the control of the CPU 101. The AGP bus 121 is a proposed bus interface for graphics accelerator cards for increasing the speed of graphics processing, and can increase the speed of a graphics accelerator card by directly accessing the MEM-P 102 with high throughput.

The short range communication circuit unit 120 is provided with a short range communication circuit 120a. The short range communication circuit 120a is a communication circuit of Near Field Communication (NFC), Bluetooth (registered trademark), or the like.

The engine control unit 130 includes the scanner unit 131 and the printer unit 132. The operation panel 140 includes a panel display unit 140a, such as a touch panel, which displays a current setting value, a selection screen, or the like and accepts input from an operator; and an operation panel 140b, such as a numeric pad, which accepts a setting value of an image forming condition, such as a density setting condition, and a start key, which accepts a copy start instruction. The controller 110 controls the entire information processing apparatus 10 and controls, for example, rendering, communication, input from the operation panel 140, and the like. The scanner unit 131 or the printer unit 132 includes an image processing section for performing error diffusion or gamma conversion.

The information processing apparatus 10 can sequentially switch among the document box function, the copy function, the printer function, and the facsimile function and select one of the functions by using an application switching key of the operation panel 140. When the document box function is selected, the document box mode is set; when the copy function is selected, the copy mode is set; when the printer function is selected, the printer mode is set; and when the facsimile function is selected, the facsimile mode is set.

The network I/F 150 is an interface for performing data communication using the communication network 100. The short range communication circuit unit 120 and the network I/F 150 are electrically coupled to the ASIC 106 via a PCI bus 122.

<Functional Configuration>

Figure 2:
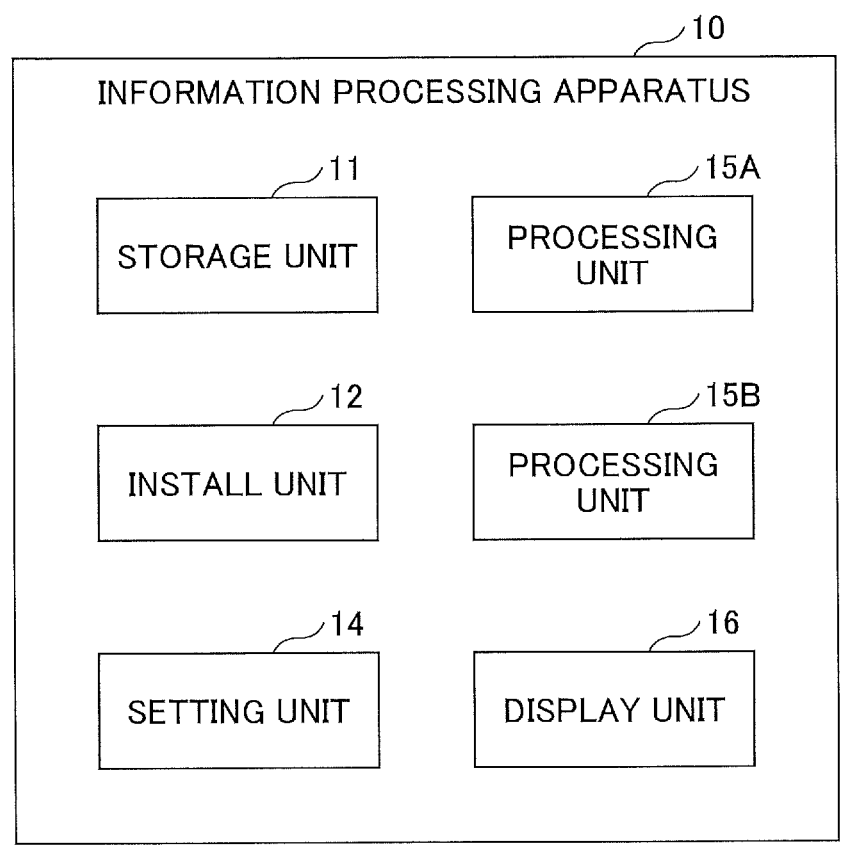
FIG. 2 is a diagram illustrating an example of a functional configuration of an information processing apparatus according to the first embodiment of the present invention.

Next, the functional configuration of the information processing apparatus 10 according to an embodiment will be described with reference to FIG. 2. FIG. 2 is a diagram illustrating an example of a functional configuration of the information processing apparatus 10 according to an embodiment. The information processing apparatus 10 includes a storage unit 11, an install unit 12, a setting unit 14, a processing unit 15A, a processing unit 15B (hereinafter, when it is not necessary to distinguish between these processing units, simply referred to as a "processing unit 15"), and a display unit 16. The functions of the respective units may be implemented by cooperation between one or more programs installed in the information processing apparatus 10 and the CPU 101 or the like of the information processing apparatus 10. The number of the processing units 15 is not limited to the example illustrated in FIG. 2.

The storage unit 11 stores various types of data. The install unit 12 causes the information processing apparatus 10 to additionally install an application program (an example of a "second application", hereinafter, referred to as an "application B" as appropriate) according to operations by a user such as an administrator or the like at a timing after the start of operation of the information processing apparatus 10. For example, the install unit 12 may be implemented by cooperation between a program for installing the application B (an installer of the application B) and the CPU 101 or the like of the information processing apparatus 10.

The setting unit 14 accepts settings for a plurality of applications installed in the information processing apparatus 10, from a user. The setting unit 14 sets each setting item for each application installed in the information processing apparatus 10 according to an instruction from the install unit 12. For example, the setting unit 14 aggregates (aligns, consecutively arranges) the setting items belonging to the same category among the setting items for the respective applications.

The display unit 16 displays the setting items on a setting screen in an order based on information indicating the display order of the setting items for the respective applications set by the setting unit 14. The setting unit 14 and the display unit 16 may be implemented by cooperation between a setting program which is pre-installed at the time of shipment or the like of the information processing apparatus 10, and the CPU 101 or the like of the information processing apparatus 10.

The processing unit 15A executes a process by an application program that is pre-installed at the time of shipment of the information processing apparatus 10 (an example of a "first application", hereinafter referred to as an "application A" as appropriate). The processing unit 15A may be implemented by cooperation between the application A and the CPU 101 of the information processing apparatus 10. The processing unit 15A may execute the basic process for each function such as copying, printing, and scanning based on information set by the user with the setting unit 14.

The processing unit 15B executes a process by the application B that is additionally installed, based on information set by the user with the setting unit 14. The processing unit 15B may be implemented by cooperation between the application B and the CPU 101 of the information processing apparatus 10. The processing unit 15B may execute an extended process on at least some of the functions, for example, among copying, printing, and scanning, based on information set by the user with the setting unit 14. In this case, for example, the processing unit 15B may execute an "unauthorized copy prevention printing" process in which printing is executed upon embedding a background pattern and a character string for unauthorized copy prevention.

The functional units of the embodiment described above may be implemented by one or more processing circuits. As used herein, a "processing circuit" includes a processor that executes each function by software, such as a processor implemented in electronic circuits, an Application Specific Integrated Circuit (ASIC), a digital signal processor (DSP), or a field programmable gate array (FPGA) designed to execute each function as described above, or a device such as a conventional circuit module.

<Process>

Figure 3:
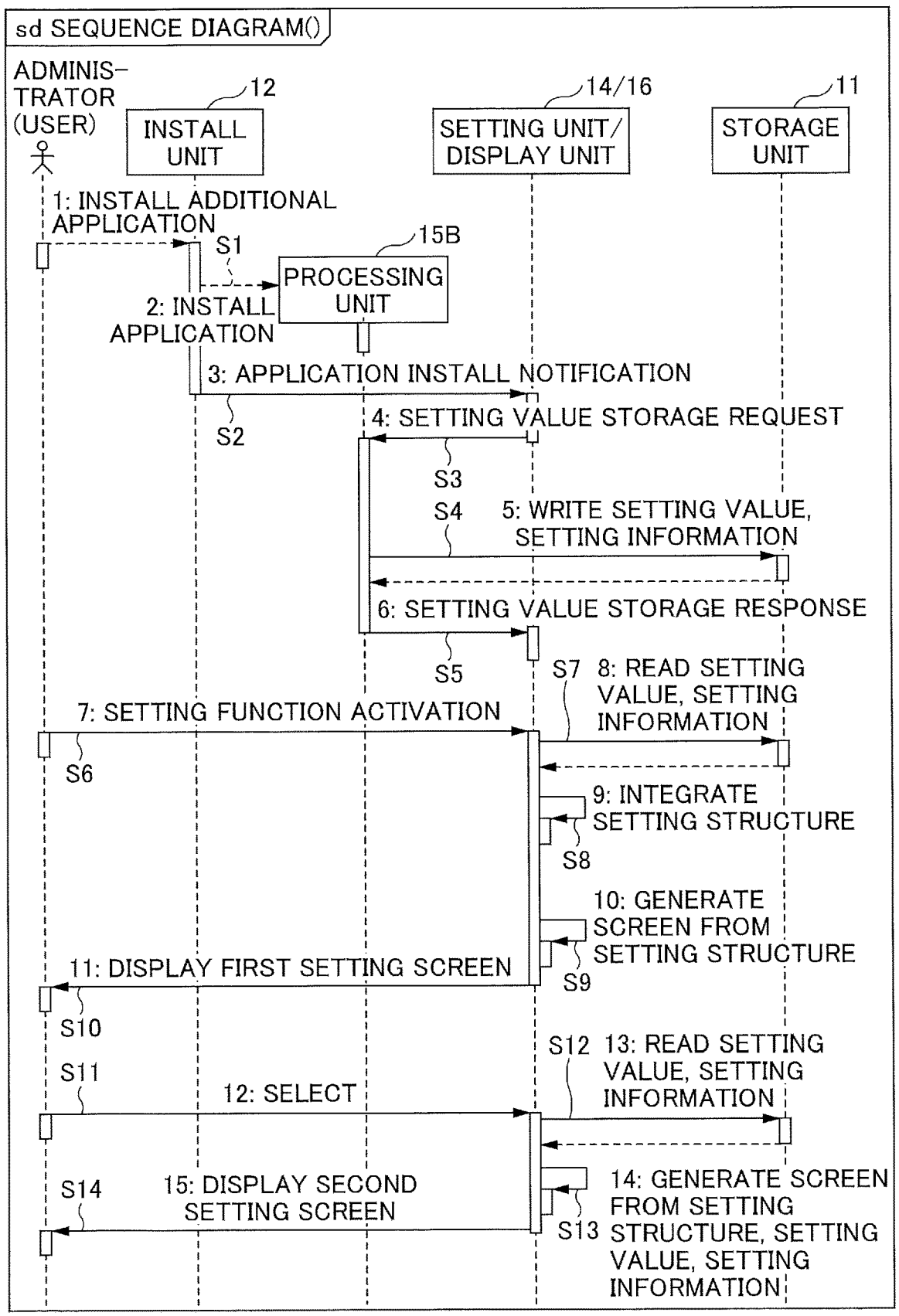
FIG. 3 is a flowchart illustrating an example of a process performed in an information processing apparatus according to the first embodiment of the present invention.
Figure 5:
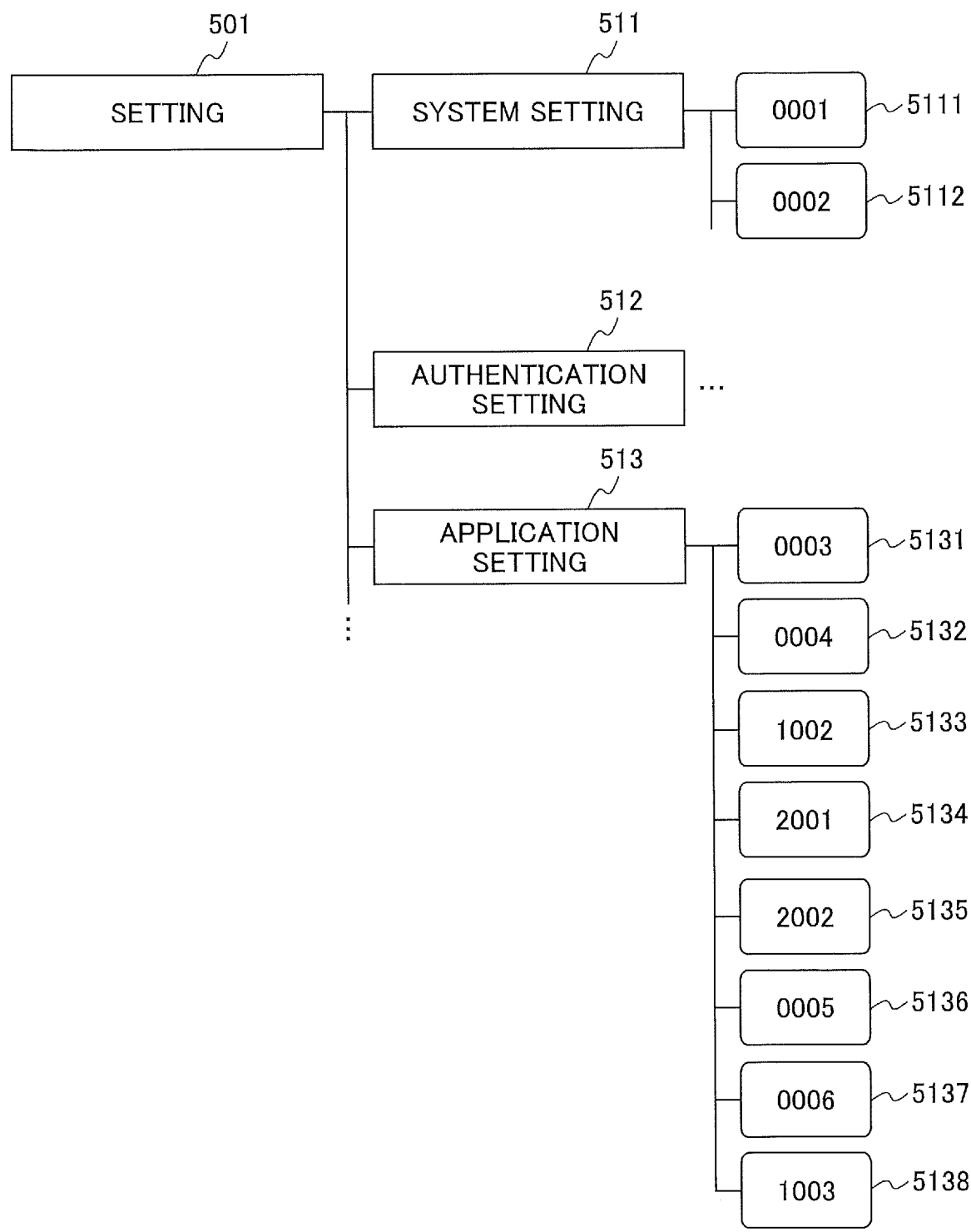
FIG. 5 is a diagram illustrating an example of a setting structure indicating a hierarchy and a display order of setting items according to the first embodiment of the present invention.
Figure 6A:
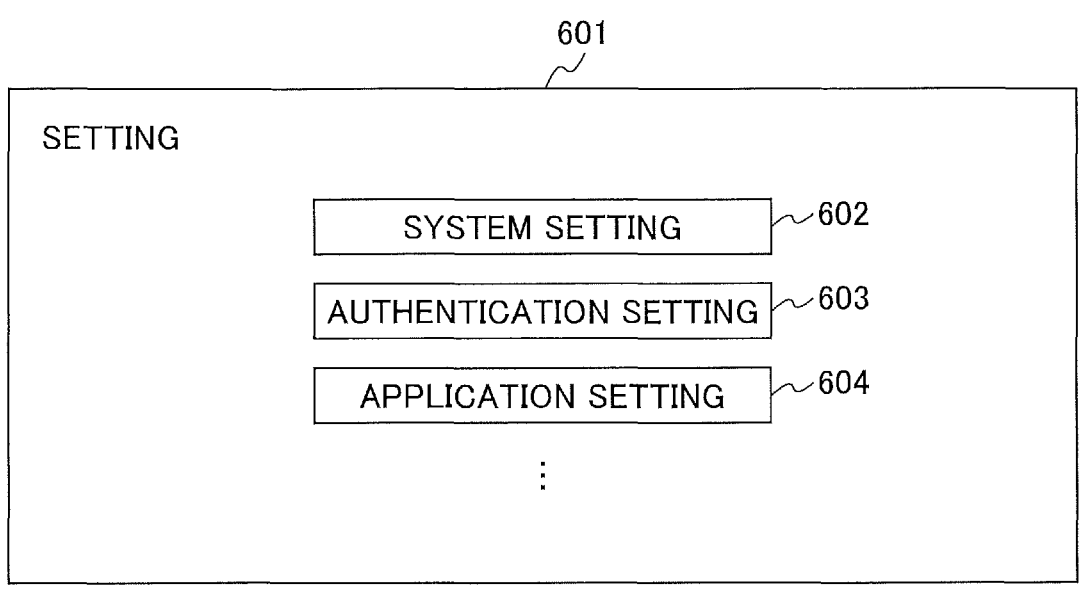
FIG. 6A is a diagram illustrating an example of a setting screen according to the first embodiment of the present invention.
Figure 6C:
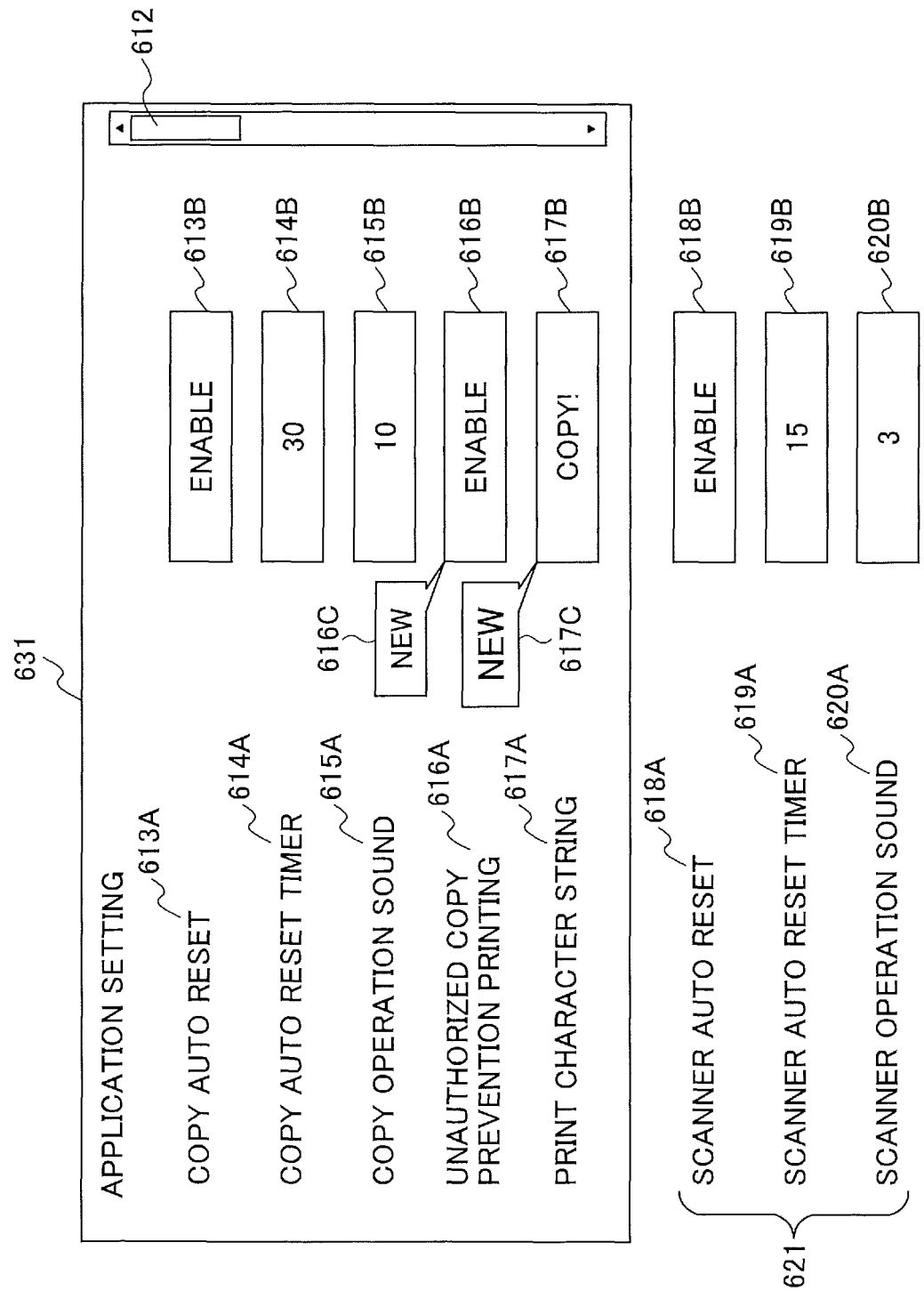
FIG. 6C is a diagram illustrating an example of a setting screen according to the first embodiment of the present invention.
Figure 7A:
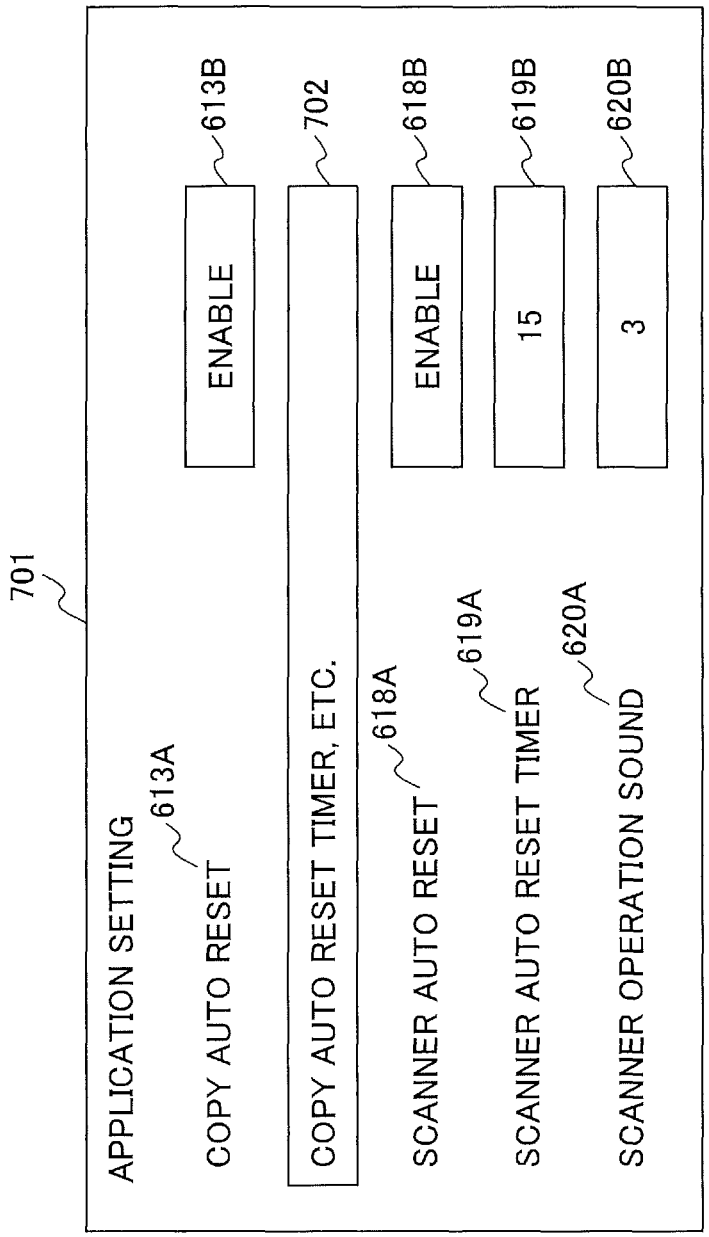
FIG. 7A is a diagram illustrating an example of a setting screen according to the first embodiment of the present invention.

Next, an example of a process executed in the information processing apparatus 10 according to the embodiment will be described with reference to FIGS. 3 to 7B. FIG. 3 is a flowchart illustrating an example of a process executed in the information processing apparatus 10 according to an embodiment. FIG. 4A is a diagram illustrating an example of data stored in a setting database (DB) 111 according to an embodiment. FIG. 4B is a diagram illustrating an example of data stored in a setting DB 111A according to an embodiment. FIG. 4C is a diagram illustrating an example of data stored in a setting DB 111B according to an embodiment. FIG. 5 is a diagram illustrating an example of a setting structure illustrating a hierarchy and a display order of setting items according to an embodiment. FIGS. 6A to 6C are diagrams illustrating an example of a setting screen according to an embodiment. FIGS. 7A and 7B are diagrams illustrating an example of a setting screen according to an embodiment.

Hereinafter, an example in which the application B is additionally installed in the information processing apparatus 10 in which one or more applications A are already installed, will be described. Note that it is assumed that the information processing apparatus 10 has already succeeded in authenticating a user such as an administrator.

<<Install>>

In step S1, the install unit 12 transmits an installation request to install the application B, to the processing unit 15B, in response to an operation from a user such as an administrator. The installation request for the application B may include, for example, information concerning the setting items of the application B and information such as an executable file (application file) for the application B.

Here, the install unit 12 may install the application B in the information processing apparatus 10 by using a function of the operating system (OS) of the information processing apparatus 10. Thus, the information processing apparatus 10 includes the processing unit 15B.

The install unit 12 may display, for example, a button for activating the application B on a display screen (for example, a top screen, a desktop screen, a standby screen, etc.) of the information processing apparatus 10. Accordingly, the user can press the button to use the additionally installed application B.

Subsequently, in step S2, the install unit 12 transmits a notification for installing the application B, to the setting unit 14. Subsequently, in step S3, the setting unit 14 transmits a registration (storage) request to register information concerning the setting items of the application B, to the processing unit 15B. Here, information concerning the path of the setting DB 111 of the storage unit 11 may be included in the registration request.

Subsequently, in step S4, the processing unit 15B registers the information concerning the setting items of the application B, to the setting DB 111 of the storage unit 11. In the example of FIG. 4A, in the setting DB 111, each record including items of the setting owner, the setting item ID, the setting type, the input range, the title (the name of the setting item), the setting value, the arrangement screen, and the display order (the display position) is registered.

The setting owner is information indicating the application to be the setting target. The setting owner may be, for example, the name of an application to be the setting target based on the setting item related to the setting item ID. The setting item ID is the identification information of the setting item displayed on each setting screen displayed by the setting unit 14. Note that a business operator (a person in charge) who performs the development, etc., of the information processing apparatus 10 may assign, in advance, each setting item ID for the application B that is unique in the system, with respect to a business operator (a person in charge) who performs the development, etc., of the application B.

The setting type is the type of the value (data) to be set in the corresponding setting item. The input range is the range of values that can be set for the corresponding setting item. The title (setting item name) is the name of the corresponding setting item. The setting value is the value currently set for the corresponding setting item. The arrangement screen is information specifying the setting screen on which the corresponding setting item is displayed, among the settings screens displayed by the setting unit 14. The display order is the information specifying the priority of the display position of the corresponding setting item in the setting screen specified in the corresponding arrangement screen.

In the example of FIG. 4A, the value of the display order of each setting item of each application is specified by an integer within the range of 1 to 256. In the example of FIG. 4A, a record in which the setting item ID with respect to the application B is "2001" and a record in which the setting item ID with respect to the application B is "2002", are added by a "security application" (an example of the application B) implementing the processing unit 15B.

The processing unit 15B (application B) executes a process of each function based on the setting value for the setting item whose setting item ID is "2001" and the setting value for the setting item whose setting item ID is "2002". If each setting value has not been changed by the user, the initial value (default value) specified by the application B when the application B is installed, may be used.

In the example of FIG. 4A, the setting item for which the setting item ID is "2001" is the setting item for the "unauthorized copy prevention printing" function, and the user can specify whether the corresponding function is to be turned on (enable) or off (disable). The setting item for which the setting item ID is "2002" is the setting item for the "print character string" function, and the user can specify the character string to be printed on the copied document, etc. In the example of FIG. 4A, the setting value of the setting item with the setting item ID of "2001" is "enable", and the setting value of the setting item with the setting item ID of "2002" is "COPY!". Therefore, a setting is made such that when the document is copied, a character string reading "COPY!" is printed on the copied document, etc.

The application B may specify, as information indicating the display order of the setting item B1 of application B, the ID of a setting item A1 that is the one before the corresponding setting item B1. The processing unit 15B or the setting unit 14 may refer to the setting DB 111 of FIG. 4A to acquire the value of the display order of the setting item A1 and the value of the display order of a setting item A2, which is the next display order with respect to the setting item A1 in the same arrangement screen as the setting item A1. The processing unit 15B or the setting unit 14 may register a value, based on the value of the display order of the setting item A1 and the value of the display order of the setting item A2, as the value of the display order of the setting item B1, in the setting DB 111 of FIG. 4A. In this case, for example, the processing unit 15B or the setting unit 14 may register the value based on the average value of the value of the display order of the setting item A1 and the value of the display order of the setting item A2, as the value of the display order of the setting item B1, in the setting DB 111 of FIG. 4A. The processing unit 15B or the setting unit 14 may use, for example, the average value itself as a value based on the average value. In this case, when "1002" is specified as the ID of the setting item A1 that is the one before the setting item B1 for which the setting item ID is "2001" and the title is "unauthorized copy prevention printing", the value of "216", which is the average value of "208" and "224", is registered as the value of the display order of the setting item B1 as illustrated in FIG. 4A. Similarly, when "2001" is specified as the ID of the setting item that is the one before the setting item B2 for which the setting item ID is "2002" and the title is "print character string", the value of "220", which is the average value of "216" and "224", is registered as the value of the display order of the setting item B2. Accordingly, the values representing the display orders of the setting items are distributed, so that when additionally installing another application thereafter, instances where the desired display position cannot be specified, can be reduced. The processing unit 15B or the setting unit 14 may use, for example, a value obtained by rounding off the average value, etc., as the above-described value based on the average value.

Subsequently, in step S5, the install unit 12 transmits a report indicating that the registration of information concerning the setting items of the application B has been completed, to the setting unit 14. Accordingly, the setting unit 14 can display a setting screen for accepting the settings for a plurality of applications including the application A and the application B in response to an operation from the user.

<<Setting Application>>

Subsequently, in step S6, the setting unit 14 accepts an operation to activate the setting function from the user. Here, for example, an operation of pressing a button for activating a setting function (a setting application) may be accepted on a display screen (for example, a top screen, a desktop screen, a standby screen, or the like) of the information processing apparatus 10.

Subsequently, in step S7, the setting unit 14 reads out the information registered in the setting DB 111. Subsequently, in step S8, the setting unit 14 determines the hierarchy and display order of the setting items based on the information registered in the setting DB 111. Thus, for example, a setting screen in which the setting items of each category are aggregated, can be displayed.

Here, the setting unit 14 determines the display orders (display positions) of the setting items displayed in each setting screen based on the information stored in the setting DB 111 of FIG. 4A. Here, the setting unit 14 may determine that the setting items are displayed in an ascending order of the value of the item of "display order", in each setting screen specified by the item of "arrangement screen".

In the example of FIG. 5, it is illustrated that the screen of "setting" 501, which is the top screen of the setting screen, transitions to any of the screens of "system setting" 511, "authentication setting" 512, and "application setting" 513, etc. Further, according to an ascending order of the value of the item of "display order" in the setting screen of "system setting" 511, the corresponding setting screen displays the setting item having the setting item ID of "0001" 5111 and the setting item having the setting ID of "0002" 5112, etc., in the stated order. Further, according to an ascending order of the value of "display order" in the "application setting" screen 513, the corresponding setting screen displays the setting items having the setting IDs of "0003" 5131, "1004" 5132, "1002" 5133, "2001" 5134, "2002" 5135, "0005" 5136, "0006" 5137, and "1003" 5138, etc., in the stated order.

Subsequently, in step S9, the setting unit 14 generates a first setting screen based on the hierarchy and the display order of the determined setting items. Subsequently, in step S10, the display unit 16 displays the generated first setting screen. In the example of FIG. 6A, the setting unit 14 displays a "system setting" button 602, an "authentication setting" button 603, an "application setting" button 604, or the like in a first setting screen 601 based on the setting structure of FIG. 5.

Subsequently, in step S11, the setting unit 14 accepts an operation on the first setting screen from the user. Subsequently, in step S12, the setting unit 14 reads out the information registered in the setting DB 111. Subsequently, in step S13, the setting unit 14 generates a second setting screen based on the information registered in the setting DB 111. Subsequently, in step S14, the display unit 16 displays the generated second setting screen. Thus, for example, the setting items for the additionally installed application can be displayed on the same (common) setting screen as the already installed application without updating the setting program for implementing the setting unit 14 and the display unit 16. Therefore, it is possible to accept the settings for the application already installed and the settings for the newly installed application from the user by using a uniform user interface.

FIG. 9 is a diagram illustrating an example of a display screen 901 in which the setting items of each additionally installed application are arranged after the setting items of each application that has been already installed at the time of factory shipment or the like. In the example illustrated in FIG. 9, setting items 911A and 911B relating to a copy function of an application for copying and setting items 912A and 912B relating to a scanner function of an application for scanning, which have already been installed at the time of factory shipment, etc., are displayed in order from the top.

Below the aforementioned items, a setting item 913A for sound output by the copy function and a setting item 913B for sound output by the scanner function of additionally installed applications for sound output, are displayed in the stated order. Further, below the aforementioned items, setting items 914A and 914B for unauthorized copy prevention in the copy function of an additionally installed "security application" are displayed in the stated order. In the example of FIG. 9, the setting items of each added application are not classified by category such as copy-related or scanner-related, but are added at the end in an order of being newly installed.

On the other hand, in an embodiment of the present disclosure, when the user presses an "application setting" button 604 of FIG. 6A in the process of step S11, the display unit 16 displays a second setting screen 611 illustrated in FIG. 6B in the process of step S14. In the example of FIG. 6B, based on the setting structure of FIG. 5, the setting unit 14 displays, in the second setting screen 611, the respective combinations of titles 613A to 620A and input fields 613B to 620B of the setting values for the respective setting items, in an order of "0003", "0004", "1002", "2001", "2002", "0005", "0006", and "1003" which are the setting item IDs in FIG. 4A. When a scroll bar 612 is moved up and down, the display unit 16 displays the setting items that are not displayed on the display screen, while maintaining the display order of the respective setting items.

In the embodiment of the present disclosure, as illustrated in FIG. 6B, the setting items of each added application and the setting items of each already-installed application are rearranged (sorted) in an order of being classified according to categories such as copy-related and scanner-related. Therefore, it is possible to accept the settings for the application already installed and to accept the settings for the newly installed application from the user by using a uniform user interface.

Modified Example 1 of the Setting DB 111

In the example of FIG. 4A, an example in which the processing unit 15B specifies the values of the display order of the respective setting items of each application, with integers within the range of 1 to 256, is described. Alternatively, as illustrated in FIG. 4B, the values of the display order of the respective setting items of each application may be specified by values of a plurality of hierarchies.

In this case, as in the example of FIG. 4A, the application B may specify, as information indicating the display order of the setting item B1 of the application B, the ID of the setting item A1 that is the one before the corresponding setting item B1. The processing unit 15B may refer to the setting DB 111 of FIG. 4A to acquire the value of each hierarchy of the display order of the setting item A1. Then, the processing unit 15B may register, in the setting DB 111A of FIG. 4B, the information including the value of each hierarchy in the display order of the setting item A1 and the value of the lower hierarchy thereof, or the value in which the value of the lowest hierarchy in the display order of the setting item A1 is increased by a predetermined value (for example, 1), as the value of the display order of the setting item S1. In this case, when "1002" is specified as the ID of the setting item A1 that is the one before the setting item B1 for which the setting item ID is "2001" and the title is "unauthorized copy prevention printing", "2-1-1" including the value "1" in the hierarchy below "2-1", is registered as the value of the display order of the setting item B1, as illustrated in FIG. 4B. This prevents situations where the desired display position cannot be specified, when additionally installing another application thereafter.

Modified Example 2 of the Setting DB 111

In the examples of FIGS. 4A and 4B, an example in which the processing unit 15B specifies the values of the display orders of the respective setting items of each application, has been described. Alternatively, as illustrated in FIG. 4C, a category may be specified for each setting item of each application and the value of the display order in each specified category may be specified. Accordingly, for example, it becomes easier to specify the display order in each category.

In the example of the setting DB 111B of FIG. 4C, a category item is added to each record as compared to the example of FIG. 4A. The value of "display order" may be specified by a value of a plurality of hierarchies as illustrated in FIG. 4B.

The category refers to the category (type, attribute) of the setting item related to the setting item ID. Information of the category may be included in the installation request for installing the application B transmitted from the install unit 12 in the process of step S1.

In the process of step S8, the setting unit 14 determines the hierarchy and the display order in each category for the setting item, based on the information registered in the setting DB 111B of FIG. 4C. In the example of FIG. 4C, the category of "copy" or "scanner" is set for each setting item in the arrangement screen of "application setting". In this case, in the setting screen of "application setting", the setting unit 14 displays the respective setting items for which the category of "copy" is set, in an ascending order of the value in the item of "display order". Further, in the setting screen of "application setting", the setting unit 14 displays the respective setting items for which the category of "scanner" is set, in an ascending order of the value in the item of "display order". The display order of the categories may be set in advance by an administrator or the like.

Modified Example 1 of Setting Screen

In the second setting screen 611 of FIG. 6B, the display mode of each setting item of the additionally installed application B may be different from the display mode of each existing setting item. In this case, as in a second setting screen 631 of FIG. 6C, the setting unit 14 may display an object of a display mode according to the display order of each setting item of the application B in association with each corresponding setting item. In the example of FIG. 6C, as the distance from the current display position specified by operating the scroll bar 612 to the display position of each setting item of the application B increases, the size of each word frame 616C and 617C of "NEW", associated with the corresponding setting item, increases. Therefore, for example, the user can recognize how much of the scroll bar 612 is to be moved to display each setting item of the additionally installed application B. The display mode according to the display order of each setting item of the application B may include, for example, size, color, and blinking.

Modified Example 2 of Setting Screen

When the number of setting items related to a predetermined function becomes greater than or equal to a threshold value in the second setting screen because an application has been additionally installed or the like, the setting items related to the predetermined function may be moved to another setting screen. Thus, for example, the setting items other than the setting items related to the predetermined function in the second setting screen can be easily found by the user.

In this case, in the setting DB 111 of FIG. 4A, when a number of setting items that is greater than or equal to a threshold value is registered in a first range of values of the display order, among the setting items displayed in a predetermined arrangement screen, the setting unit 14 may move the corresponding setting items to a third setting screen.

In this case, in the example of the setting DB 111 of FIG. 4A, among the setting items for which the arrangement screen is "application setting", there are four or more setting items that are included within a difference 32 in display order values. Therefore, as illustrated in FIG. 7A, the display unit 16 does not display the corresponding four setting items in a second setting screen 701 but displays a button 702 for displaying a third setting screen for the corresponding four setting items. In the example of FIG. 7A, the setting unit 14 displays a title based on the title of the setting item of the highest order among the corresponding four setting items, as the title of the button 702.

When the button 702 is pressed, the display unit 16 displays a third setting screen 711 of FIG. 7B. In the third setting screen 711 of FIG. 7B, the setting unit 14 displays the respective combinations of titles 614A to 617A of the corresponding four setting items moved from the second setting screen 701 of FIG. 7A and input fields 614B to 627B of the setting values.

Second Embodiment

In the second embodiment, an example in which information concerning each setting item for each application that is additionally installed, is recorded in an external apparatus will be described. Accordingly, information concerning the setting items for each application of the information processing apparatus 10 can be managed on a cloud or the like. The second embodiment is the same as the first embodiment except for some portions, and, therefore, descriptions will be omitted accordingly. Hereinafter, portions common to the first embodiment will be omitted and only different portions will be described. The information processing apparatus 10 may appropriately combine and execute the processes of the first embodiment and the processes of the second embodiment.

FIG. 8 is a diagram illustrating an example of the configuration of an information processing system 1 according to the second embodiment. In the example of FIG. 8, the information processing system 1 according to the second embodiment includes the information processing apparatus 10 and a server 20.

The information processing apparatus 10 according to the second embodiment includes a transmitting/receiving unit 17. The transmitting/receiving unit 17 transmits/receives data to/from the server 20. The server 20 includes a transmitting/receiving unit 21. The transmitting/receiving unit 21 transmits/receives data to/from the information processing apparatus 10.

The second embodiment differs from the first embodiment mainly in that the server 20 includes a storage unit 22 for storing the setting DB 111, instead of having the storage unit 11 of the information processing apparatus 10 store the setting DB 111.

The process of the information processing apparatus 10 according to the second embodiment is similar to the process of the information processing apparatus 10 according to the first embodiment described in FIG. 3, but differs mainly in the following points. In the process of step S4 of FIG. 3, the processing unit 15B of the information processing apparatus 10 according to the second embodiment registers the information concerning the setting items of the application B in the setting DB 111 in the storage unit 22 of the server 20. Also, in the processes of step S7 and step S12 of FIG. 3, the setting unit 14 of the information processing apparatus 10 according to the second embodiment reads the information registered in the setting DB 111 in the storage unit 22 of the server 20.

Modified Example

Each of the functional units of the information processing apparatus 10 may be implemented, for example, by cloud computing provided by one or more computers.

According to one embodiment of the present invention, it is possible to accept settings for an application that is already installed and settings for a newly installed application, from a user at a uniform user interface.

The information processing apparatus, the method for processing information, and the information processing system are not limited to the specific embodiments described in the detailed description, and variations and modifications may be made without departing from the spirit and scope of the present invention.

What is claimed is:

1. An information processing apparatus comprising:
   a processor, and
   a memory storing program instructions that cause the processor to
   receive an installation request to install a second application subsequent to an installation of a first application, the installation request including setting, item information of the second application;
   install the second application, and
   register the setting item information of the second application in the memory, wherein
      setting item information of the first application is also registered in the memory, the setting item information of the first application indicating
         a first setting item; and
         a display category of the first setting item,
      the setting item information of the second application indicates
         a second setting item; and
         a display category of the second setting item, and
      in response to an operation by a user to activate a setting function, the first setting item and the second setting item are displayed in an aggregated manner in a case where the first setting item and the second setting item belong to a same display category.

2. The information processing apparatus according to claim 1, wherein the program instructions further cause the processor to
   set a first setting item display order of the first setting item and a second setting item display order of the second setting item, and display the first setting item and the second setting item in an order based on the first setting item display order and the second setting item display order.

3. The information processing apparatus according to claim 1, wherein the setting item information of the first application further includes first setting item identification information of the first setting item, the setting item information of the second application further includes second setting item identification information of the second setting item, and the program instructions further cause the processor to store a setting value specified by the user in a storage in response to receiving an operation by the user to specify the setting value for the second setting item, the setting value being stored in association with the second setting item identification information, and execute a process by the second application based on the setting value stored in the storage in association with the second setting item identification information.

4. The information processing apparatus according to claim 3, wherein the program instructions further cause the processor to store, in the storage, a second setting item display order value representing a display order of the second setting item, wherein the second setting item display order value is determined based on a first setting item display order value representing a first setting item display order of the first setting item, and a third setting item display order value representing a third setting item display order of a third setting item belonging to the same display category as the first setting item and, the second setting item, the third setting item display order value being a value representing a next display order within the same display category with respect to the first setting item display order.

5. The information processing apparatus according to claim 4, wherein the program instructions further cause the processor to determine the second setting item display order value by calculating an average value of the first setting item display order value and the third setting item display order value.

6. The information processing apparatus according to claim 1, wherein the program instructions further cause the processor to determine whether a number of setting items registered within a predetermined range of values of display orders of setting items in a predetermined screen is greater than or equal to a threshold number of setting items, and move the setting items to be displayed on a screen other than the predetermined screen in response to determining that the number of setting items is greater than or equal to the threshold number of setting items.

7. The information processing apparatus according to claim 1, wherein the program instructions further cause the processor to display an object of a display mode in association with the second setting item, the object of the display mode being displayed according to a display order of the second setting item.

8. A method for processing information including a process executed by an information processing apparatus, the method comprising:

receiving an installation request to install a second application subsequent to an installation of a first application, the installation request including setting item information of the second application, installing the second application; and register the setting item information of the second application in a memory, wherein setting item information of the first application is also registered in the memory, the setting item information of the first application indicating a first setting item; and a display category of the first setting item, the setting item information of the second application indicates a second setting item; and the display category of the second setting item, and in response to an operation by a user to activate a setting function, the first setting item and the second setting item are displayed in an aggregated manner in a case where the first setting item and the second setting item belong to a same display category.

9. A non-transitory computer-readable recording medium storing a program that causes a computer to execute the process included in the method according to claim 8.

10. An information processing system comprising a server; and an information processing apparatus, wherein the server includes a storage configured to store setting item information relating to a first setting item of a first application installed in the information processing apparatus and setting item information relating to a second setting item of a second application that is installed in the information processing apparatus subsequent to an installation of the first application, and wherein the information processing apparatus includes a processor, and a memory storing program instructions that cause the processor to receive an installation request to install the second application subsequent to the installation of the first application, the installation request including the setting item information of the second application;

install the second application, and register the setting item information of the second application in the storage included in the server, wherein the setting item information relating to the first application indicates a display category of the first setting item the setting item information relating to the second application indicates a display category of the second setting item, and in response to an operation by a user to activate a setting function, the first setting item and the second setting item are displayed in an aggregated manner in a case where the first setting item and the second setting item belong to a same display category.

* * * * *